April 28, 1959    B. BERGHAUS ET AL    2,884,511
METHOD AND DEVICE FOR THE AUTOMATIC CONTROL AND SUPERVISION
OF THE INITIAL PERIOD AND THE PERFORMANCE OF
ELECTRIC GLOW DISCHARGE PROCESSES
Filed May 28, 1956    5 Sheets-Sheet 1

INVENTORS:
BERNHARD BERGHAUS
HANS BUCEK
BY
ATTORNEY

United States Patent Office 2,884,511
Patented Apr. 28, 1959

2,884,511

METHOD AND DEVICE FOR THE AUTOMATIC CONTROL AND SUPERVISION OF THE INITIAL PERIOD AND THE PERFORMANCE OF ELECTRIC GLOW DISCHARGE PROCESSES

Bernhard Berghaus and Hans Bucek, Zurich, Switzerland

Application May 28, 1956, Serial No. 587,624

Claims priority, application Switzerland May 28, 1955

9 Claims. (Cl. 219—121)

The present invention relates to the treatment of workpieces in electric glow discharge processes, e.g. to improve their surfaces, and in particular to a method and device for the automatic control and supervision of the initial period and the performance of such processes.

If glow discharge processes are to be satisfactorily performed on workpieces, it is known that, at least at the discharge energies required for technical reasons, all imperfections that might have a deleterious effect on the discharge process must be rigorously eliminated from the surfaces of workpieces connected as electrodes. In most cases this entails the removal of impurities which have contaminated the surface of these articles during installation in the discharge vessel, and also residues and other surface imperfections originating in preliminary chemical or mechanical treatments. What is actually involved in this connection is a surface zone of a certain thickness and not merely the external surface. On the commencement of the glow discharge process under reduced pressure, and particularly when the temperature of the workpiece is raised, all imperfections of this kind give rise to the generation of gas or steam, to processes of reduction or oxidation, to the locally strong emission of charge carriers, and to other phenomena which result in an undesirable unevenness of the glow discharge along the surface of the workpiece. Since under these conditions some places always exhibit a higher density of discharge energy, there is a tendency towards a greater heating of the surface locally and thus towards an increasing concentration of energy thereon, which must be avoided at all costs because of the danger of arcing and of a permanent unevenness in the improved surface of the workpiece.

The most effective means of removing such imperfections from the surface of the workpiece consists in the performance of an initial process in which the workpieces are arranged as for the operation proper in the interior of the discharge vessel under reduced pressure and supplied at first with relatively low voltage from a circuit provided with means for stabilizing the discharge so that a glow discharge of low energy transformation is applied if possible to all the surfaces of the workpieces.

This initial state is continued until all the imperfections appearing at this energy level are removed by the action of the glow discharge and until the discharge is proceeding uniformly along all the workpiece surfaces as well as at any critical points in the discharge vessel, such as the insulated lead-ins. The energy of the glow discharge is then steadily raised by a certain amount, which, as experience has shown, causes new imperfections to appear. This state is again prolonged until these imperfections have been eliminated, the process then being repeated with increased energy. The preliminary process is continued until such time as the desired discharge condition with the prescribed transformation of energy on the surfaces concerned in the process is achieved, whereupon the actual treatment period commences.

This initial period of the glow discharge process takes a longer or shorter time according to the condition of the workpiece, requiring ten hours or more in some cases where the surface is extensive, and needs careful supervision, which is usually exercised by means of an optical inspection of the discharge condition of at least one section of the workpiece surface. This initial period, which is of the greatest importance in ensuring uniform quality in the treatment of the workpiece and cannot be dispensed with, has hitherto made heavy claims on labour and depended on the vigilance of the operators, which is regarded as a grave shortcoming in the application of such processes on an industrial scale.

The present invention purposes to eliminate this defect and relates to a method and apparatus for automatically controlling and supervising the initial period of the glow discharge processing of workpieces by varying the electric energy applied between an initial and final value. The method and apparatus are characterized by the fact that the energy is varied in accordance with a programme which is preset in regard to type and time sequence and automatically performed in an adjustable rhythm and in a predetermined succession for so long as no spontaneous alterations occur in the discharge of the glow process, and by the fact that such spontaneous events cause a supervising member especially sensitive to such disturbances to react and to influence the performance of the programme in a predetermined manner.

The device according to this invention for putting this method into practice is characterized by a programme controller with a preset programme consisting of a number of separate stages following one another in a time sequence, each stage of the programme being released in turn by a control receiver on the receipt of a clear signal, as well as by a supervising member reacting to spontaneous alterations in the discharge and by controlling devices, actuated by said member, to influence the programme as determined by the programme controller.

Needless to say, methods are already known in the technology of automatic controls which make it possible to control a process according to a predetermined programme. Such programme controls, however, either function according to a fixed time sequence, e.g. predetermined by the contour of a control disk rotated by clockwork, or the programme depends on a quantity that varies as the process goes on, such as the temperature or the pH value. The method according to this invention differs fundamentally from these known programme controls in that it does not depend for the control of its preset programme on any quantity that varies as the process progresses, and yet the time taken for the whole programme to be completed is largely determined by the workpieces involved in the process. The only determining factor for the performance of the programme is the appearance or non-appearance of undesirable spontaneous events, a control criterion never before used for regulating purposes.

A number of embodiments of the invention are described more fully in conjunction with Figs. 1 to 6, in which.

Figure 1:
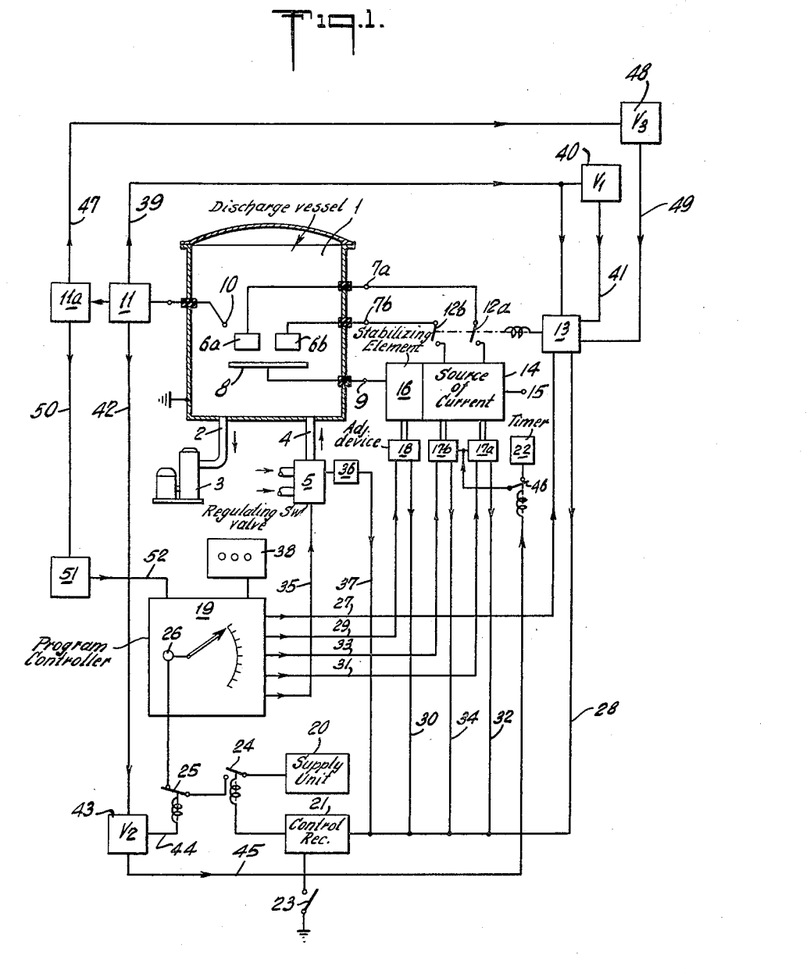
Fig. 1 is a basic circuit diagram of an embodiment of equipment for the performance of technical glow discharge processes with a device according to the present invention for the automatic control and supervision of the initial process.

The apparatus according to the basic schematic Fig. 1. contains a discharge vessel 1 in which an underpressure can be produced by the exhaust pipe 2 and the pump 3. The gas atmosphere required for the various processes is produced by supplying the appropriate types and quantities of gas through pipe 4 from the regulating switch-valve 5. By way of example, the two workpieces 6a and 6b are arranged in the discharge vessel 1 and connected by means of insulated lead-ins to terminals 7a and 7b respectively. There is a counterelectrode 8, likewise connected by means of an insulated current lead-in to terminal 9. Discharge vessel 1, mostly consisting of metal, is here by way of example not connected to any of the electrodes but earthed. Further, there is provided in discharge vessel 1 a sensitive element 10 of a supervising member 11, which serves to control the glow discharge condition at workpieces 6a and 6b.

The two terminals 7a and 7b are each supplied over a power switch 12a and 12b respectively, which are actuated jointly or singly by the switch operator device 13, from a source of current 14, which is in turn supplied with energy over the terminal 15 from a suitable mains, for instance a three-phase mains. In the given example, the source of energy can be regulated separately in regard to voltages supplied to terminals 7a and 7b. The common return circuit from terminal 9 of the discharge vessel 1 runs in this instance over stabilizing element 16, for instance a variable inductance of continuous or multistage pattern. Regulators 17a and 17b are provided to vary the voltages supplied to terminals 7a and 7b respectively. Likewise the stabilizing element 16 is varied by means of an appropriate adjusting device 18 working continuously or in stages.

With the parts of the apparatus so far described it would be possible to perform the initial part of the glow discharge process manually in the manner customary hitherto by, for example, actuating the switch-throwing gear 13 and closing switches 12a and 12b, and then, for example, first performing the initial process for workpiece 6a with regulator 17a, and subsequently the corresponding process for workpiece 6b with the regulator 17b, appropriate values being selected for the stabilizing element 16. It will be obvious that such a method of performing the initial processes makes heavy demands on the operating staff.

In contrast, the entire initial process can be performed according to the present invention perfectly automatically and in the shortest possible time. For purposes of explanation let it be assumed that the initial process comprises the six stages $T_1$ to $T_6$ (in actual practice it is normal for the number of stages in the programme to be much larger) shown in Fig. 2, where the traces A and B represent the voltages it is intended to apply to workpieces 6a and 6b respectively.

Figure 2:
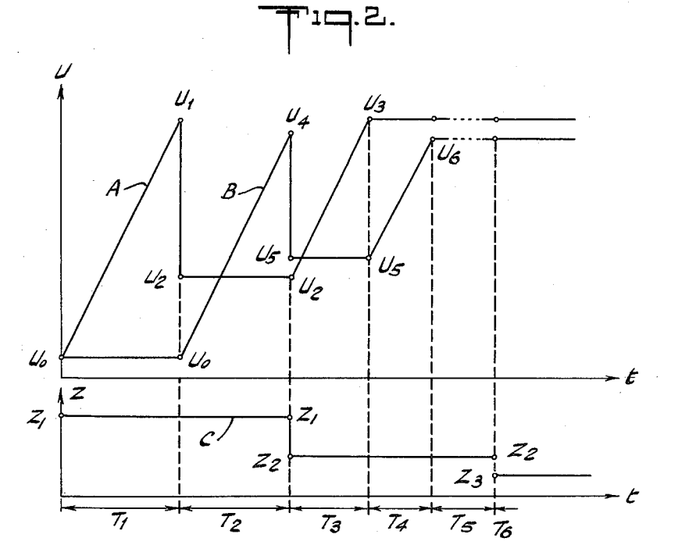
Fig. 2 is a diagram of an example of one of the control programmes used with the equipment shown in Fig. 1.

Stage $T_1$: The initial voltage $U_0$ applied to workpiece 6a is increased to the final voltage $U_1$, the voltage on workpiece 6b remaining at value $U_0$. After attaining $U_1$ the voltage on workpiece 6a is reduced to value $U_2$, at which the glow discharge ceases; during this time the value of the stabilizing impedance is $Z_1$ as shown by the trace C.

Stage $T_2$: The workpiece 6a retains its voltage $U_2$ while the voltage on workpiece 6b is raised from an initial value $U_0$ to a final voltage $U_4$ and then reduced to a lower value $U_5$; the stabilizing impedance continues at the value $Z_1$.

Stage $T_3$: The stabilizing impedance has the lower value of $Z_2$ while the voltage on workpiece 6a is again increased from $U_2$ to the final value $U_3$ and remains at this level. During this time the voltage on workpiece 6b remains at the value $U_5$.

Stage $T_4$: The voltage on workpiece 6a retains the value $U_3$ and the stabilizing impedance the value $Z_2$ while the voltage on workpiece 6b is raised from $U_5$ to the value $U_6$.

Stage $T_5$: The stabilizing impedance maintains the value $Z_2$ and the workpieces 6a and 6b continue to carry voltages $U_3$ and $U_6$ respectively. During this interval, however, the gas atmosphere is changed in regard to the dominating type of gas.

Stage $T_6$: After the gas atmosphere has been changed, the stabilizing impedance is reduced to the operating value $Z_3$, whereby the discharge condition is attained and the actual treating process commences.

Of course, the programme instanced here could only be performed in the chronological sequence represented in Fig. 2, provided there was no occurrence anywhere of irregularities in the discharge, to eliminate which the discharge condition prevailing at the time of the occurrence would have to be maintained unaltered for a longer period. A case of this kind will be described in greater detail below.

The apparatus for the automatic performance of a given programme is schematically represented in Fig. 1 and comprises the actual programme controller 19, a control receiver 21 and a timer 22 to actuate the regulator elements 17a and 17b. The performance of the programme is, for instance, started by actuating switch 23 of the control receiver 21, thus temporarily closing a control contact 24 which connects the supply unit 20 over the closed resting contact 25 to the stepping mechanism 26 of the programme controller so that the latter is switched from its operative position to its first control position. All the subsequent performance of the given programme takes place automatically after this start—always provided that the supervising member 11 does not react—and will be described in brief below.

In the first control position, the switch-throwing gear 13 relating to switches 12a and 12b is excited over lead 27 by the programme controller 19 and these switches are closed. The completion of this operation is reported over circuit 28 to the control receiver 21 by means of a clear signal which causes the receiver to close control contact 24 temporarily so that the stepping mechanism 26 of the programme controller is moved forward to its next position by the supply unit 20. In this position the stabilizing impedance 16 is set at value $Z_1$ over the lead 29 and the regulator 17a is released to effect the increase in voltage on workpiece 6a according to stage $T_1$ of the programme in Fig. 2. Upon its release, the regulator 17a is actuated continuously or stepwise by the timer 22 in such a way that the increase of voltage is effected in the temporal sequence predetermined according to trace A in Fig. 2. On the final position corresponding to voltage $U_1$ of the workpiece being attained, a clear signal is passed over lead 32 to control receiver 21 which, acting over control contact 24, causes the programme controller 19 to be stepped to the third control position, simultaneously procuring over lead 31 the return of regulator 17a, either continuously or stepwise, to a position corresponding to voltage $U_2$. This concludes stage $T_1$ of the programme.

In the third control position, the regulator element 17b is released by programme control device 19 over lead 33 so that, controlled by the timer 22, it can effect the increase of voltage on workpiece 6b required by stage $T_2$ from voltage $U_0$ to $U_4$ according to trace B in Fig. 2. On attaining a position corresponding to voltage $U_3$ the regulator 17b sends a clear signal over lead 34 to the control receiver 21 so that the latter can step the programme controller 19 to the fourth position by acting through the control contact 24. Simultaneously the regulator 17b is returned continuously or stepwise to the position corresponding to voltage $U_5$. This concludes stage $T_2$ of the programme.

In the fourth position the adjusting device 18 relating to the stabilizing impedance 16 is operated over lead 29 and set at the lower value $Z_2$. Simultaneously the regulator 17a is released again so that the voltage of the workpiece 6a is raised by the amount required for stage $T_3$ from value $U_2$ to the final value $U_3$ according to the trace A in Fig. 2, the regulator 17a being appropriately controlled by the timer 22. On the position corresponding to the final value $U_3$ being attained, a signal is again passed from the regulator element 17a over the lead 32 to the control receiver 21 which, acting through the control contact 24, steps the programme controller to the fifth position while the regulator 17a remains in the final position it has attained. This concludes stage $T_3$ of the programme.

In the fifth control position, the regulator 17b is again released by the programme controller 19 over lead 33 so that it may be actuated by timer 22 and raise the voltage of workpiece 6b from $U_5$ to $U_6$ the final value according to trace B in the stage $T_4$. The clear signal of the regulator 17b on reaching this final value $U_6$, acting through the control receiver 21, causes the programme controller to be stepped to the sixth position, while the regulator 17b also remains in the final position corresponding to the voltage $U_6$ on the completion of stage $T_4$ of the programme.

In stage $T_5$ of the programme, now commencing, the gas atmosphere in the discharge vessel is to be changed, entailing for example, the replacement of a reducing gas such as hydrogen appropriate to the initial process by the gas required for the actual treatment of the workpiece. To this end, the programme control device 19, in the sixth position, actuates the regulating change-over valve 5 so that another type of gas enters the discharge vessel 1 from the pipe 4. The exchange of gas is completed after a period of time corresponding to stage $T_5$ and a clockwork mechanism 36, adjusted to act after the elapse of this period, sends a clear signal over lead 37 to the control receiver 21 in order to step the programme controller 19 to the seventh position.

In the seventh position, the programme controller 19 actuates over lead 29 the adjusting device 18 relating to the stabilizing impedance 16 and sets the latter at its operating value $Z_3$, whereupon a clear signal is passed over lead 30 to the control receiver 21. This steps the programme controller to the eighth position, thereby concluding stage $T_6$ of the programme.

When in the eighth control position, the programme controller 19 may be employed, for example, to switch the control leads 31 and 33 relating to regulators 17a and 17b respectively over to a push-key control panel 38, from which the voltage required for the treatment of the workpieces can be adjusted manually, while the programme controller 19 and the control receiver 21 become inoperative. If desired, automatic gear for controlling the operation can, of course, be brought into action instead of the control panel 38 and will regulate the desired discharge conditions and keep them constant during the treatment period of the process which now begins and continues for many hours or even days.

It would be highly desirable if the programme could be performed as described under practical working conditions, but this is hardly practicable, for the workpieces always have some imperfections on their outside surfaces or in the surface zone involved in the process. Consequently the supervising member 11 checking the uniformity of the glow discharge in the discharge vessel 1 frequently reacts and influences the performance of the programme as described below. The spontaneously and arbitrarily occurring changes in the glow discharge condition which influence the sensitive element 10 of the supervising member 11 usually begin immediately after the first strike of the glow discharge, i.e. already in stage $T_1$ of the programme. The number of these spontaneous events is always unknown—with workpieces of substantial size, for example of 10,000 cm.$^2$ superficial area, it was ascertained on the completion of such a programme that the supervising member had reacted on several thousand separate occasions and influenced the performance of the programme. Moreover, the duration of each such spontaneous alteration in the discharge condition is quite uncertain. All that is known is that the minimum decay time is fixed by the necessary deionization at between 10 and 20 milliseconds. On the other hand such undesirable events with a decay time of up to one minute have been observed.

The control device according to the present invention is able to render such spontaneous changes in the discharge condition harmless. To this end, on the reaction of the supervising member 11, the switch-throwing gear relating to switches 12a and 12b is immediately brought into action with a minimum delay of at the most a few milliseconds over lead 39 and the supply of current to terminals 7a and 7b interrupted. Simultaneously the adjustable time-delaying member 40 is excited by the actuation of the switch-throwing gear 13 and causes the reclosing of switches 12a and 12b, quite independently of whether the supervising member 11 is still excited or not. It is preferable for the time-delaying member to be set at a time period such that the interruption of current supplied through switches 12a and 12b does not last longer than from 20 to 100 milliseconds, that is to say, that in the event of a non-recurrent disturbance in the discharge, the deionization of the disturbance centre has already taken place when the switches have been reclosed. If, on the reclosing of the switches, the supervising member 11 reacts again, the switching-off process described is repeated for the same interruption period V.

On the reaction of the supervising member 11, the time-delaying member 43 is excited over circuit 42, which in turn opens contact 25 over lead 44 and contact 46 over lead 45 for an adjustable time period $V_2$. This prevents the further stepping up of programme controller 19 as well as the actuation of regulators 17a and 17b by the timer 22 during the time interval $V_2$. In this way the performance of the control programme is stopped for the period $V_2$ and the latest stage of operations reached is maintained. A magnitude of 30 to 300 seconds has proved to be adequate for the time interval $V_2$. On the expiring of this period the programme is continued in the manner prescribed. It is more advantageous for the time-delaying member 43 to be so adjusted that in the event of the supervising member again reacting during the time interval $V_2$, the time-delaying member 43 is set back to its initial position, i.e. the contacts 25 and 46 are closed and the performance of the operation according to programme can continue only if the time interval $V_2$ has elapsed since the last reaction of the supervising member 11. Further a counting device is combined with supervising member 11 and ascertains the frequency with which the supervising member 11 reacts. On the registration of a predetermined and adjustable number of disturbances per unit of time, e.g. 10 per second, a time-delaying member 48 is actuated over wire-lead 47. The time-delaying member 48 actuates the switch-throwing gear 13 over lead 49 and opens switches 12a and 12b for the time interval $V_3$, for instance for 30 seconds, so that the glow discharge on workpieces 6a and 6b ceases. If desired, a corresponding reduction of voltage to a lower value can be effected instead of an interruption. Simultaneously the resetting device 51 is actuated over lead 50 and in turn acts through conductor 52 on the programme controller 19 and causes the latter to be reset at a stage of the programme that has already been performed. Experience shows that this arrangement makes it possible to render harmless violent changes in the discharge condition caused by serious gas outbursts on the surfaces of the workpiece and to prevent the occurrence of an undesirable flash-over.

Figure 3:
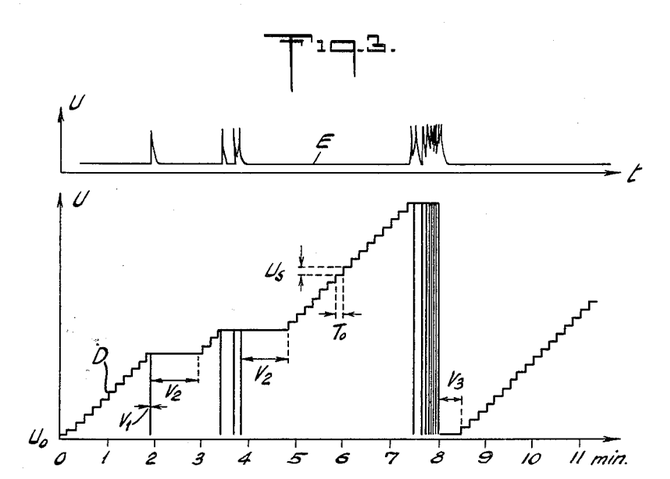
Fig. 3 is an excerpt from a diagram of a control programme showing how it has been influenced by the supervising member according to the present invention.

The influence exercised on the programme by the supervising member 11 is reproduced in the diagram according to Fig. 3, where the trace D shows, for example, the increase of voltage on workpiece 6a in stage $T_1$ of the programme, i.e. according to trace A in the diagram of Fig. 2, on a greatly increased time scale. In this connection it is assumed that the timer 22 adjusts the regulator 17a by the partial voltage of $U_s$ at intervals of $T_0=10$ seconds. The trace E reproduces the reaction in pulses of the supervising member 11 on the same time scale, whereby it is assumed that each pulse of this trace effects an opening of the switch 12a for the time interval $V_1$ of 20 milliseconds.

After about ten regulation steps of the regulator 12a, the striking voltage of the glow discharge is attained, which causes the first reaction of the supervising member 11, thereby effecting the switching off of the current supplied to the workpiece 6a during the time interval $V_1$, and moreover prevents further actuation of the regulator 17a by the timer 22 during a time interval $V_2=60$ seconds, so that during this time the voltage on workpiece 6a remains practically constant. On the expiry of the time interval $V_2$ the performance of the programme continues. If, as indicated in the diagram according to Fig. 3, on the next reaction of the supervising member 11 during the time interval $V_2$ further reaction impulses from the supervising member 11 reach the time-delaying member 43, the latter is always set back to its initial position. Only when, after the reaction of the supervising member 11, there has been no further spontaneous change in the discharge condition during the time interval $V_2$, can the performance of the programme continue in the predetermined manner. In this way it is ensured that the adjustment of the discharge process reached at any given time can only be relinquished when stabilization has been accomplished. All the same, it is observed in practice that the preliminary process remains in the same condition for a substantial length of time, because, for instance, impurities of any size must first be removed through the action of the glow discharge.

If, however, a condition is reached during the further performance of the programme in which a violent disturbance, such as a gas outburst on the surface, appears, which causes the supervising member 11 to react in quick succession, then, if the frequency of reaction is sufficiently great, the time-delaying member 48 is actuated and voltage is cut off from the workpiece 6a for the duration of the time interval $V_3$ of, for instance, 30 seconds. Simultaneously the regulator 17a is returned to its initial position, so that at the end of the time interval $V_3$ the programme is in the same place as at the beginning of that in the diagram in Fig. 3, i.e. at voltage $U_0$. Of course, the programme controller 19 may be set back more than one stage of the programme. Further, the stabilizing impedance may, by way of example, be temporarily switched to its maximum value $Z_1$. As may be seen, the supervising member 11 and the sensitive element 10 relating thereto are of decisive importance in the performance of the initial period of such glow discharge processes. In the arrangement indicated in Fig. 1, of the sensitive element 10 inside the discharge vessel 1, the element may take the form, for example, of an antenna or other suitable coupling member for the detection of electromagnetic waves which, as experience shows, appear on the surfaces of the workpieces when there are spontaneous alterations in the discharge condition. In this case the supervising element 11 consists of an amplifier for these high-frequency oscillations connected up with suitable signalling equipment. There is also the possibility, however, of ascertaining the various spectral components of the glow, for example by means of suitable windows in the discharge vessel and converting spontaneously occurring alterations in the glow into suitable signals. Needless to say, such undesirable spontaneous alterations in the discharge conditions also have their effect on the energy requirements at terminals 7a and 7b respectively or 9, and may be registered by means of sufficiently sensitive measuring apparatus at the supply leads and the power supply equipment respectively and converted into control signals.

Figure 4:
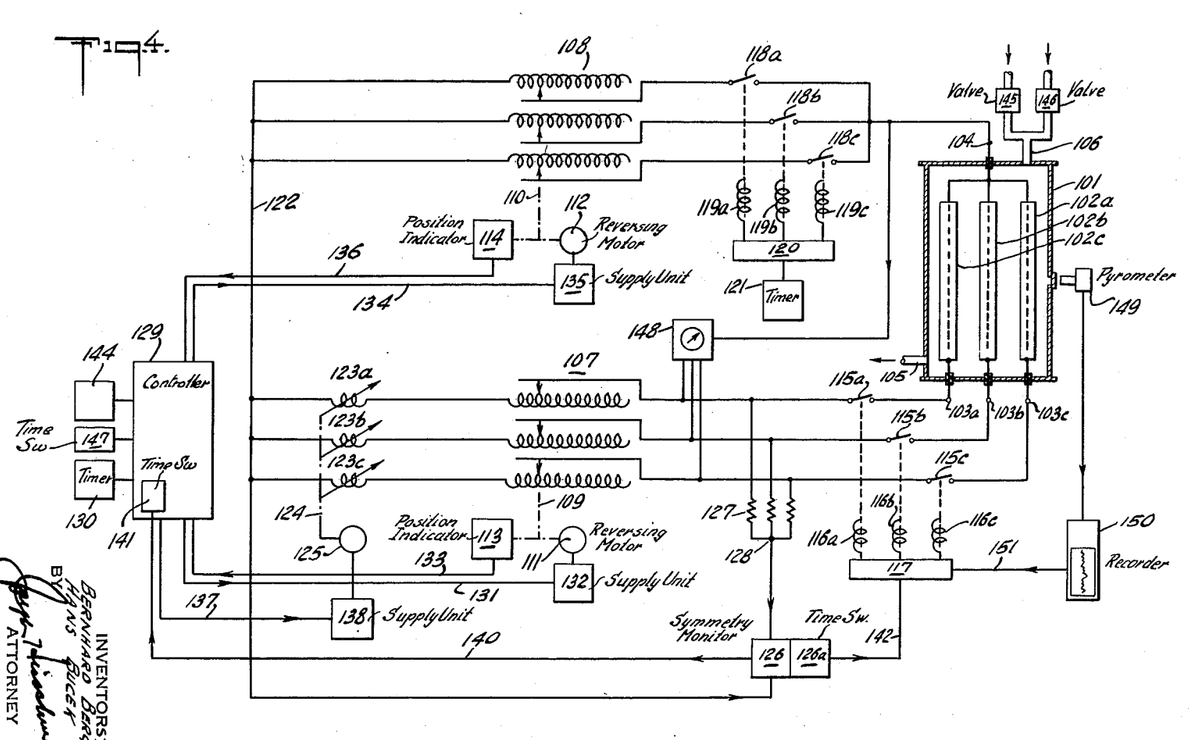
Figs. 4 to 6 illustrate a further embodiment of the control device.

The simplified wiring diagram reproduced in Fig. 4 represents an apparatus for the performance of the process according to the invention where three steel tubes 102a, 102b, 102c (or a multiple of this number, whereby three groups are formed, each group being represented by 102a, 102b, 102c respectively) are to be nitrided by means of the glow discharge process in the metal container 101. The tubes 102 are connected over an insulated lead-in with the terminals 103a, 103b, 103c. An internal lead, for example a 3 mm. thick steel wire, is arranged within each separate tube and insulated from it. All the internal leads are linked in parallel inside the container and connected over an insulated lead-in with the terminal 104. The container is provided with an exhaust pipe 105, which is connected to a pump, as well as with a gas supply pipe 106.

The glow process is performed, by way of example, by means of three-phase alternating current of 50 cycles from three-phase variable transformers 107 and 108, whose three windings are connected one at a time to terminal 104. Both transformers 107 and 108 are represented in Fig. 4 only by their secondary windings. The primary windings can be joined in Y or delta connection to the three-phase mains. Transformers 107 and 108 are each provided with an adjusting mechanism 109 and 110 respectively, which is common for all three taps on the windings, these devices being adjustable to a higher or lower secondary voltage by means of the reversible motors 111 and 112 respectively. The adjuster mechanisms 109 and 110 are each fitted with a position indicator 113 and 114 respectively which actuates a contact each for the initial and final position and can, if desired, also signal intermediate positions. Instead of there being separate transformers 107 and 108, all the secondary windings can, of course, be arranged on the same core, or only three common windings can be provided with two adjusting mechanisms each.

The three secondary windings of the variable transformer 107 are each connected over magnetic switches 115a, 115b and 115c respectively with terminals 103a, 103b and 103c respectively, which can be actuated independently of one another from relay unit 117 over their operating magnets 116a, 116b and 116c respectively. On the other hand the three magnetic switches 118a, 118b, 118c respectively in the connecting leads from the secondary windings of the transformer 108 to the terminal 104 are so locked in opposition by the relay unit 120 which controls the operating magnets 119a, 119b and 119c respectively that no more than one magnetic switch can be turned on at a time. The relay unit 120 is connected to a timer 121, which in an adjustable rhythm, for example at intervals of a second, cuts out the switch 118 that has just been thrown on and connects another, so that the three secondary windings of the transformer 108 supply the internal lead successively over the lead 104.

The secondary windings of the variable transformer 108 are operated in star connection and are connected to the neutral wire 122. The secondary windings of the regulating transformer 107 are also operated in star connection, but here impedance coils 123a, 123b and 123c respectively are inserted in the connecting leads from the neutral wire 122 to the three secondary windings. All three impedance coils are regulable and provided with an adjusting mechanism 124, which is in turn actuated reversibly by the motor 125. In the present embodiment, the impedance value of the coils 123 can be adjusted stepwise, there being four steps provided with the impedances of 30, 15, 5 and 1 ohm respectively.

The neutral wire is furthermore connected with the so-called symmetry monitor 126 which is in addition connected with the neutral point 128 of the three secondary phase voltages, this point being formed by the three resistances 127. This symmetry monitor 126, which represents an important feature of the present control method, reacts to any voltage amplitude in excess of an adjustable minimum value between the neutral wire 122 and the neutral point 128, independently of the character of the voltage in respect to time, its phase situation and polarity.

The control of all the regulating and switching devices is effected centrally from a controller 129, to which a timer 130 is connected. The controller 129 is connected with the supply unit 132 of the adjusting motor 111 relating to the regulating transformer 107 and receives over lead 133 the answer-back signal of the position indicator 113. The controller 129 can furthermore actuate the adjusting motor 112 of the variable transformer 108 over the control lead 134 and the supply unit 135, and receive over lead 136 the answer-back signal from its position indicator 114. Moreover, the supply unit 138 for the adjusting motor 125 of the impedance coils 123 is actuated over control lead 137 in one direction or the other.

The functioning of the controller 129 is arranged by means of suitable relays, step-by-step switching devices or electronic means in such a way that the requisite control processes are always performed successively, but the next process is initiated only when the one immediately preceding it has been reported back to the controller 129 as completed by a receipting signal. Thus if a controlling process which is in progress is stopped by a regulating device independent of the controller 129, the next control process cannot begin until the halted control process, after being released by the regulating device, has been completed and its receipting signal has been received by controller 129. A regulating device of this kind is represented by the symmetry monitor 126 which, on being actuated over controller 129, influences the supply units 132, 135, 138 for the adjusting motors of the variable transformers 107 and 108 and of the impedance coils 123 in an appropriate manner to be described in greater detail. Further, the relay set 117 and through this the magnetic switches 115 are actuated over the time-switch 126a and the lead 142.

In the embodiment represented in Fig. 4 of a nitriding process on steel tubes, it has proved advantageous to subdivide the initial process into twelve successive part processes. The controller 129 is designed accordingly and makes it possible to perform all the part processes automatically. The separate part processes and their normal course are explained in greater detail in the two diagrams of Fig. 5. In this connection let it be assumed first of all that the symmetry monitor 126 does not react during the whole initial process. The effect of a disturbance during the initial process causing the symmetry monitor 126 to react will also be discussed in greater detail below.

Figure 5:
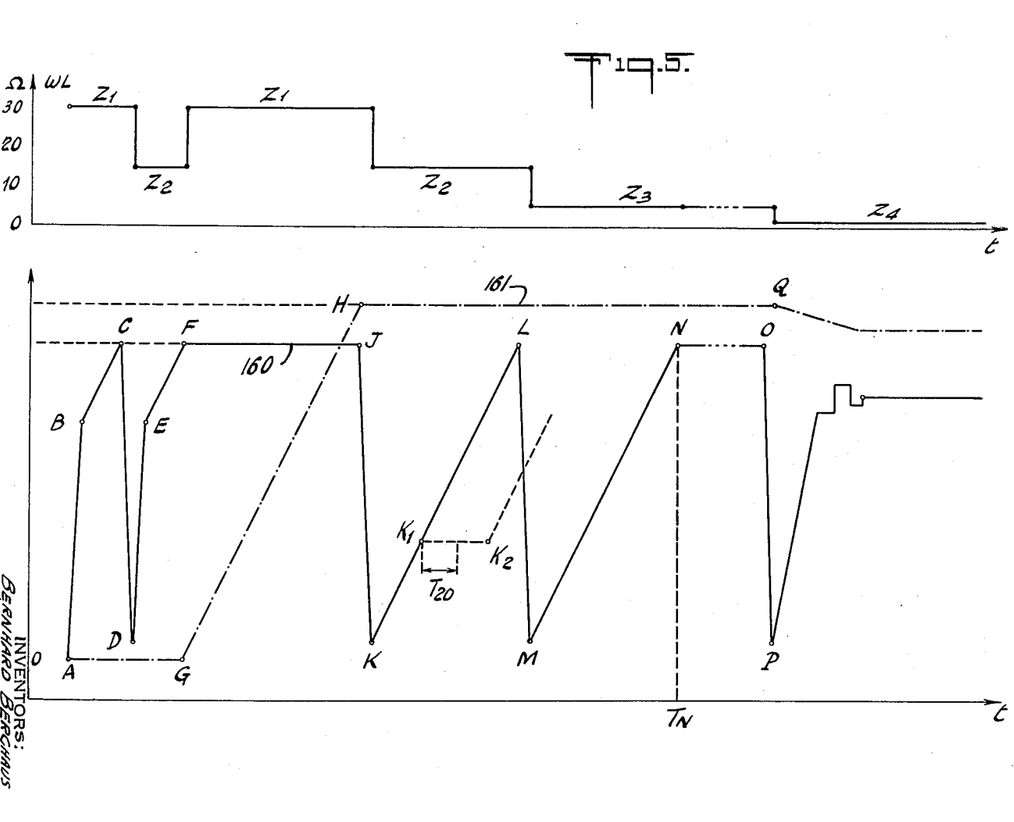

Fig. 5 shows in the lower diagram, plotted over the time axis $t$, the trace 160, which represents the voltage $U_i$ at the terminal 104 of the internal lead, as well as the dotted trace 161, which corresponds to the phase voltage $U_a$ on the tubes applied at one of the terminals 103. In the upper diagram the impedance value of the individual coils 123 is given above a similar time axis $t$.

When the apparatus together with the automatic equipment is switched on, both the voltage $U_a$ and the voltage $U_i$, corresponding to point A, approximate first of all to zero, and the impedance of the coils 123 is at its maximum value $Z_1$ (30 ohms). The supply unit 135 is now actuated over control lead 134 by the controller 129, and the motor 112 is turned on at full speed. The voltage $U_i$ of the internal lead rises while $U_a = 0$ remains. As soon as the striking voltage is reached, a glow discharge is produced in the container between the internal leads and the pipes 102. This usually causes an initial reaction of the symmetry monitor 126, which influences the controller over lead 134 in such a way that the supply unit 135 now supplies the motor 112 only in pulses corresponding to the rhythm of the timer 130 (point B).

Thus the adjusting mechanism 110 is now advanced stepwise at intervals of, for instance, 0.5 to 1 second, so that the increase of the voltage $U_i$ from point B is less steep in respect to time and should really be represented in the diagram by a stepped line. On the maximum voltage $U_i$ at point C being attained, the first part process is terminated, the position indicator 114 reporting this over lead 136 to the controller 129, which thereupon allows the second part process to begin.

Hereat the motor 112 runs at maximum speed in reverse, so that the voltage $U_i$ decreases and finally at point D practically becomes zero. Point D could be placed at a higher voltage $U_i$ but in any case below the strike voltage for the glow discharge. The termination of this part process is transmitted by an end contact in the position indicator 114 to the controller 129, which switches over to the next part process.

The switch-over to the third part process causes the supply unit 138 for the adjusting motor 125 of the impedance coils 123 to be actuated over lead 137 and switches the coils to the next lowest value $Z_2$ (15 ohms). Simultaneously the motor 112 is again started at maximum speed in the contrary direction, the voltage $U_i$ rises once more and at point E again causes the glow discharge to strike. In the same manner as at point B a switch-over is hereupon effected in the controller 129, so that the motor 112 continues to be actuated only in pulses. On point F and the voltage $(U_i)$ max. being reached, the third part process is terminated, this being reported to the controller 129 by the position indicator 114.

It may be mentioned here that the values $(U_i)$ max. and $(U_a)$ max. only give the voltages at the end positions of the regulating transformers. For the terminal voltage at the connections 103 and 104 the voltage drop at the impedance coils 123 must be taken into account.

With the commencement of the fourth part process the adjusting mechanism of the variable transformers 108 is left unchanged in the end position attained, so that the voltage $(U_i)$ max. is applied to the inner leads until further notice. Simultaneously, however, the impedance coils 123 are returned by controller 129 over lead 137, the supply unit 138 and the adjusting motor 125 to their position with the maximum impedance value $Z_1$ (30 ohms), and moreover the supply unit 132 is actuated over the control lead 131 in the rhythm of the timer 130, so that the motor 111 advances the adjusting mechanism 109 stepwise. Thus from the point G the voltage $U_a$ on the three terminals 103 begins to rise in steps, while at the same time the glow discharge in the interior of the tubes 102 continues.

Since the voltages $U_i$ and $U_a$ originate from the same three-phase mains, there naturally results on the raising of the current $U_a$ on the tubes 102 a reactive effect on the glow discharge between the internal lead and the tubes, this always occurring on that group of workpieces, 102a, 102b or 102c, in which the same alternating voltage phase is applied to both the tube and the internal lead. In this group of workpieces, the difference of voltage between the external and internal leads decreases as the voltage $U_a$ rises, so that from a certain $U_a$ value on, the glow discharge ceases. But since, as mentioned above, the timer 121, acting over the relay set 120, opens and closes the magnetic switches 118a, 118b and 118c in turn, the glow discharge will in this way cease at regular intervals of, say, a second in the tube interiors of another of the workpiece groups. According to the phase situation of the voltages from the variable transformers 107, 108, the voltage difference can assume the value zero or another value. It is, however, desirable for the glow discharge to cease since this favours the gas correction in the interior of the tube.

The voltage $U_a$ rises from point G to value $(U_a)$ max. in the final position of the variable transformer 107. On reaching the final position, corresponding to point H, an answer-back signal is transmitted from position indicator 113 over the lead 133 to the controller 129, which hereupon causes the return of the adjusting mechanism on the variable transformer 108, while the adjusting mechanism of the variable transformer 107 remains in the end position attained. The voltage $U_a$ on the terminals 103a, 103b, 103c thus maintains until further notice the value $(U_a)$ max., while the voltage $U_i$ is reduced as from point F to the value of approximately $U_i=0$ at point K. On point K being reached, the position indicator 114 brings about the change to the next part process by means of an answer-back signal to the controller 129. Hereat the controller 129 effects the switching of the impedance coils from value $Z_1$ to the next lowest value $Z_2$ (15 ohms), and then the actuation of the supply unit 135 for the motor 112 in the rhythm of the timer 130 so that the voltage $U_i$ again rises stepwise and reaches the maximum value $(U_i)$ max. at point L. In this end position an answer-back signal is transmitted again from the position indicator 114 to the controller 129, which causes the motor 112 to run in reverse at maximum speed until point M with $U_i=0$ is reached. This concludes the part process.

On point M being reached, the controller 129 causes the impedance coils 123 to be switched to the next lowest value $Z_3$ (5 ohms) and effects once again the reversal of the adjusting motor 112, which again causes the voltage $U_i$ to rise stepwise until point N with $(U_i)$ max. is attained, whereon the part process is concluded.

The two variable transformers 107 and 108 are now in their end position and the glow discharge energy is at its maximum value. If desired this maximum value can, despite the voltage drop at the impedance coils 123, be made equal to the standard operating value by suitable dimensioning of the windings 107, 108. The duration of this first stage of the initial process can be altered according to the setting of the timer 130 on the controller 129. A time of about 20 minutes has proved suitable for sizeable workpieces with a surface area of several square metres, always providing—and this is scarcely ever the case in practice—that no disturbance causes the symmetry monitor 126 to react during the whole process. This first stage of the initial process up to time point $T_n$ serves to free the surfaces of the workpieces from disturbing imperfections, for which reason the discharge vessel 101 is filled with a reducing gas, for instance hydrogen, at a pressure of, say, between 1 and 10 mm. Hg. For this, the container 101 is permanently connected with a pump over pipe 106 and is supplied with $H_2$ gas through an electrically operated valve 145.

On the completion of this first stage of the initial process, the hydrogen is slowly replaced by dry ammonia gas, which process takes about 30 minutes unless a disturbing phenomenon causes the symmetry monitor 126 to react. While this is taking place, the maximum voltage $(U_a)$ max. and $(U_i)$ max. is present at the terminals 103 and 104 respectively. The exchange of $H_2$ and $NH_3$ is automatically effected by controller 129, which closes valve 145 and opens valve 146.

On the completion of this part process, whose duration is determined by a time switch 147, i.e. from point O onwards, the adjusting mechanism 110 of the variable transformer 108 is again returned at maximum speed to its initial position, so that the voltage $U_i$ at the point P is at its minimum value. On point P of trace 160 being reached, to which point Q of the trace 161 corresponds in time, the initial process is completed and the controller 129 releases the adjusting and switching equipment it has hitherto operated. Simultaneously the impedance coils 123 are switched to the lowest impedance value $Z_4$ (1 ohm).

Now the actual nitriding process begins in which both $U_a$ and $U_i$ are set at a desired value which produces a corresponding magnitude of discharge energy. The power can, for example, be read from the instrument 148 and the temperature of the workpiece supervised by means of a radiation pyrometer 149 with the recorder 150 and, if desired, also kept constant automatically, by way of example, over the control lead 151 by the actuation of the magnetic switches 115, 116. The nitriding process can likewise, if desired, be performed automatically by a special controller, or by manual control and observation of the instruments.

As already mentioned, the plot of the traces 160 and 161 in Fig. 5 is based on the assumption that the symmetry monitor 126 does not react from point B onwards. This is hardly ever the case in reality and this controlling device is of the greatest importance for an unattended automatically performed initial process, for only with the assistance of such a rapidly reacting controlling device can the uniform treatment of the workpieces be ensured and undesirable surface defects avoided with certainty. Let it be assumed that, as the voltage $U_i$ rises stepwise after point K, the symmetry monitor 126 reacts at point K because, for instance, a minor gas outburst at a spot on the surface has caused a somewhat greater discharge current than at workpieces 102b and 102c. In this case the supply of energy over the three magnetic switches 115a, 115b and 115c must be immediately interrupted in order to avoid a local over-heating of the spot in question on the workpiece 102a. This very rapid switch-off is effected by the symmetry monitor 126, for an increase in voltage in the one phase results in a corresponding difference in voltage at the neutral point 128 compared with the neutral lead 122. The symmetry monitor 126 has a very small operating time constant, so that the magnetic switches 115 are immediately opened. The actuation of the magnetic switches 115 is effected over the time-switch 126a and the lead 142, the time-switch 126a determining the time period $T_{10}$, during which the magnetic switches 115 remain open. A time period $T_{10}=0.2$ sec. has proved suitable. When this time period $T_{10}$ has elapsed since the last reaction of the symmetry monitor, all three magnetic switches are closed again. Experience shows that a short interruption of operations of this kind suffices to allow minor gas outbursts to die down. If, however, another disturbance appears immediately, the switches are closed again or if the previous disturbance has not completely died away, the symmetry monitor reacts again and once again interrupts the supply of current by means of magnetic switches 115.

Apart from actuating magnetic switches 115 as described, the symmetry monitor 126 also effects a reaction over lead 140 of the time-switch 141 in the controller 129 which interrupts the stepping up of the supply units 132, 135, and 138, thus precluding any further change in the regulating and switching equipment for the transformers 107 and 108 as well as in the impedance coils 123. Thus the voltage $U_i$ remains constant from point $K_1$ onwards, as indicated in Fig. 5 by the dotted line, for at least the time period $T_{20}$. As the time period $T_{10}$ is very much smaller than $T_{20}$, a new disturbance may occur before the expiry of the time period $T_{20}$, that is to say that the symmetry monitor 126 may react again. This causes the time-switch 141 to return to its initial position, so that the time period $T_{20}$ begins again and the voltage $U_i$ continues to be maintained. Only when the symmetry monitor 126 does not react during a time interval of $T_{20}$ does the time switch 141 release the controller 129 (point $K_2$) and the control process interrupted by the time-switch 141 continues.

Through this interruption of the normal course of the control processes at every reaction of the symmetry monitor 126, the initial processing of the workpieces 102 under treatment can be prolonged many hours according to the state of the surface. The imperfections of the surfaces can in every case be successfully removed without local overheating or other detrimental effects coming into evidence. In practical cases, for example the simultaneous nitriding of rough steel tubes, each some 3 metres in length it was found that the symmetry monitor 126 reacted more than 10,000 times during the initial process, which lasted about 8 hours. After the completion of such an initial process, the nitriding operation can be performed with a discharge power of 40 to 50 kw. for about 50 hours virtually unattended and without disturbances of any importance.

Figure 6:
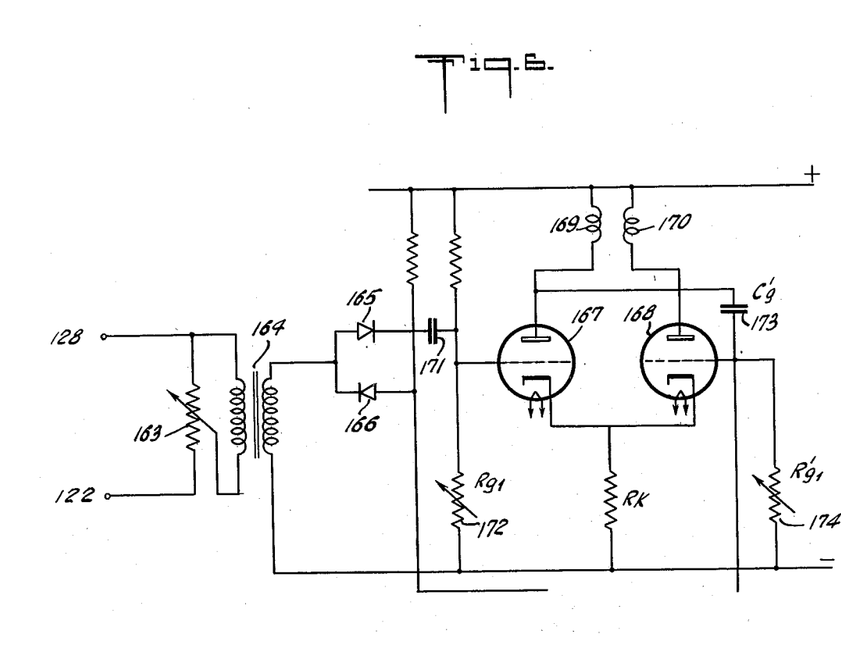

Fig. 6 shows the wiring diagram for an embodiment of such a symmetry monitor, the two input terminals of which are connected with the neutral lead 122 and the neutral point 128 (Fig. 4) respectively. Parallel to the two terminals 122 and 128 is the potentiometer 163, which serves as a sensitivity controller, from which the signal voltage for the primary winding of an input transformer 164 is tapped. This transformer is constructed as an impulse transformer with a steep saturation characteristic which supplies steep impulses to its secondary winding as soon as an alternating voltage is applied to its primary winding. These impulses from the secondary winding arrive, according to their polarity, over the rectifiers 165 and 166 at the control grids of the tubes 167 and 168 respectively and effect a current impulse in the plate circuits pertaining thereto. To both plate circuits, however, there belongs a winding, 169 and 170 respectively, of the same relay, so that any stress on the primary winding of the transformer 164 causes this monitor relay to react momentarily. The condensers 171 and 173 included in the grid circuits together with the resistances 172 and 174 respectively produce a time constant which is sufficient to cause the monitor relay to react on the appearance of even a short impulse on the secondary winding of the transformer 164. The mutual coupling of the tubes 167, 168 ensures that whenever one tube reacts, the other tube also produces a current impulse in the plate circuit, which increases the excitation of the monitor relay.

Connected as a time-switch 126a with the symmetry monitor 126 (Fig. 4) is an electronic circuit having an adjustable decay period constant of about 0.2 second. The time-switch 141 in the controller 129 is also an electronic circuit in the present embodiment.

The automatic control apparatus described above in conjunction with Figs. 4 to 6 represents an embodiment of the present control method. The chief feature of this control method resides in the fact that the workpieces to be treated are divided into two or more groups, here for example three, which should be as similar as possible in their energy requirements. These groups of workpieces are supplied with operating voltage increasing in steps or continuously according to a predetermined programme, with the possibility, however, of the performance of the programme being stopped by a controller and maintained in the condition last reached for as long as desired. In this connection the controller ascertains whether energy is being taken symmetrically by the leads supplying the workpiece groups and reacts as soon as a preset symmetry in the energy taken varies by more than a predetermined and adjustable amount, the direction of a variation in symmetry being without effect on the reaction sensitivity of the controller, likewise the magnitude of the energy taken by the groups of workpieces.

Accordingly this symmetry-monitoring of the supply lead is based upon the knowledge that the spontaneously occurring disturbances of the glow discharge virtually never appear at the same time on different groups of workpieces. On the contrary, it may be regarded as highly probable that such a spontaneous event will occur only on one group of workpieces and thus effect a displacement in the symmetry of the energy taken by the supply leads.

The basic circuit diagram reproduced in Fig. 4 is intended for the initial process of a glow discharge process performed simultaneously on three groups of workpieces with three-phase current. The present method of control is, however, by no means confined to this and can be employed for every discharge process on at least two groups of workpieces in the same container. According to the number of workpiece groups a suitable current supply system is provided of the two-lead, three-lead or multi-lead type with a neutral wire, the supply leads of which carry symmetrical voltages in comparison with the neutral wire. Thus a symmetry control between the neutral wire and an artificially created symmetry point on the container terminals is always possible.

It should be pointed out that this method of control is practicable not only with two or multi-phase alternating current. For example it can be used for rectified alternating current, for impulse currents and even for direct current, provided a corresponding two or multi-lead supply system is created which is symmetrical in comparison with a neutral wire.

Having now particularly described and ascertained the nature of our said invention and in what manner the same is to be performed, we declare that what we claim is:

1. In an automatic control and supervising system for use in current supply systems for the operation of gas and glow discharge chambers, the combination with a discharge chamber, of a current supply device for said chamber, a programming device for regulating the current supply device according to a predetermined program consisting of a plurality of individual steps following each other in series, means for moving the programming device step-by-step, a control receiver governing the said moving means and adapted, upon receipt of a clear signal, to effect movement of the programming device to the next following program step, a supervising member responsive to a spontaneous change in the discharge in the chamber, and a back-setting device for the said moving means controlled by the supervising member.

2. An automatic control and supervising system as defined in claim 1, including a regulator for the current supply device actuated on the step-by-step movement of the programming device.

3. An automatic control and supervising system as defined in claim 2, including an adjustable timer for intermittently actuating the regulator, said moving means being connected with said timer.

4. An automatic control and supervising system as defined in claim 2, wherein the regulator is provided with an end position contact for transmitting a clear signal to the programming device to effect advance of the latter to the next following step of the program.

5. An automatic control and supervising device as defined in claim 2, including control elements, actuable by the supervising member, for preventing the reception of clear signals by the control receiver.

6. An automatic control and supervising system as defined in claim 1, including a regulator for the current supply device actuated on the step-by-step movement of the programming device, control elements for preventing the reception of clear signals by the control receiver and connected so as to be excited at the first reaction of the supervising member, a time-delaying member adjustable between 0.5 and 5 minutes and determining the return of the control elements to their position of rest, and a further time-delaying member adjustable between 0.05 and 0.5 second for determining the restoration of the energy supply.

7. An automatic control and supervising system for use with a 3-phase current supply device for the operation of gas and glow discharge chambers for the treatment of three groups of electrically connected workpieces, comprising, in combination with a discharge chamber, a three-phase transformer having a variable tap on each of the three secondary windings, each tap being adapted to be connected with one of three groups of workpieces in the chamber, a common adjusting mechanism for actuating the three taps, three identical iron impedance coils adjustable with respect to their impedance values, switch means for varying the said impedance values, one of said coils being disposed in the connecting leads of each of the three secondary windings of the transformer with a common neutral wire, three impedances forming a symmetry point, each being connectible to one of the supply leads for the three groups of workpieces, a programming device for actuating the adjusting mechanism for the three secondary taps of the transformer and the said switch means for the series impedances, and magnetically operating switches in each of the supply leads for the three workpiece groups.

8. An automatic control and supervising system as defined in claim 7, wherein the discharge chamber is provided with an inner conductor for each of three tubular workpieces passing through the latter and insulated therefrom, three switches, said inner conductors being connected with each other and with said switches, a second three-phase transformer provided with secondary taps, a timer actuating said switches one at a time and thereby establishing connection between an inner conductor and one of the three secondary taps of the second transformer, and a common adjusting device coupling the secondary taps and actuated by the programming device.

9. An automatic control and supervision system for use with current supply devices for the operation of gas and glow discharge chambers for carrying out technical processes, comprising, in combination with a discharge chamber, a programming device adapted to be set for a predetermined program consisting of a number of separate steps following one another in a time sequence, means for operating said devices step-by-step, a current supply device connected with the discharge chamber and controlled by said programming device, a supervising member sensitive to a spontaneous alteration in the discharge in said chamber, a controlling device actuated by said supervising member to vary the program of the programming device to allow for elimination of said spontaneous alteration before the programming device proceeds to the next step of the preset program, means for interrupting the operation of the programming device in response to a signal from the supervising member, a control receiver, means for transmitting to said receiver a clear signal when, at the step of the programming device in operation at any time, no spontaneous alteration in the discharge exists, and means controlled by the control receiver for releasing the programming device to enable it to proceed to the next step.

References Cited in the file of this patent
UNITED STATES PATENTS

| | | |
|---|---|---|
| 752,358 | Price | Feb. 16, 1904 |
| 1,047,502 | Coolidge | Dec. 17, 1912 |
| 1,966,496 | Fruth | July 17, 1934 |
| 2,577,411 | Faulk | Dec. 4, 1951 |
| 2,715,698 | Riley et al. | Aug. 16, 1955 |